Nov. 5, 1940.   A. HOFFMANN ET AL   2,220,651
PRESSURE RESPONSIVE INSTRUMENT
Filed March 19, 1938    2 Sheets-Sheet 1

Inventor
August Hoffmann &
Julius Zoller
A. D. Adams
Attorney

Nov. 5, 1940.  A. HOFFMANN ET AL  2,220,651
PRESSURE RESPONSIVE INSTRUMENT
Filed March 19, 1938   2 Sheets-Sheet 2

Inventors
August Hoffmann &
Julius Zoller

By A. D. Adams
Attorney

Patented Nov. 5, 1940

2,220,651

UNITED STATES PATENT OFFICE 2,220,651

PRESSURE RESPONSIVE INSTRUMENT

August Hoffmann and Julius Zoller, Berlin, Germany, assignors to Askania-Werke A. G., a corporation of Germany Application March 19, 1938, Serial No. 197,024
In Germany October 2, 1936

15 Claims. (Cl. 73—110)

This invention relates to improvements in pressure responsive instruments.

The invention aims to reduce the dimensions of the device and to increase the sensitiveness and exactness from which the measuring value or the controlling impulse is derived.

Another object of the invention consists therein that the sensitiveness and exactness of the device is guaranteed within the entire measuring range, even in cases of an extremely high pressure load on the impulse responsive member.

Other objects and advantages of this invention will now be more fully explained with reference to the accompanying drawings in which an illustrative example of diaphragm pressure gauge is shown. In these drawings.

Figure 1:
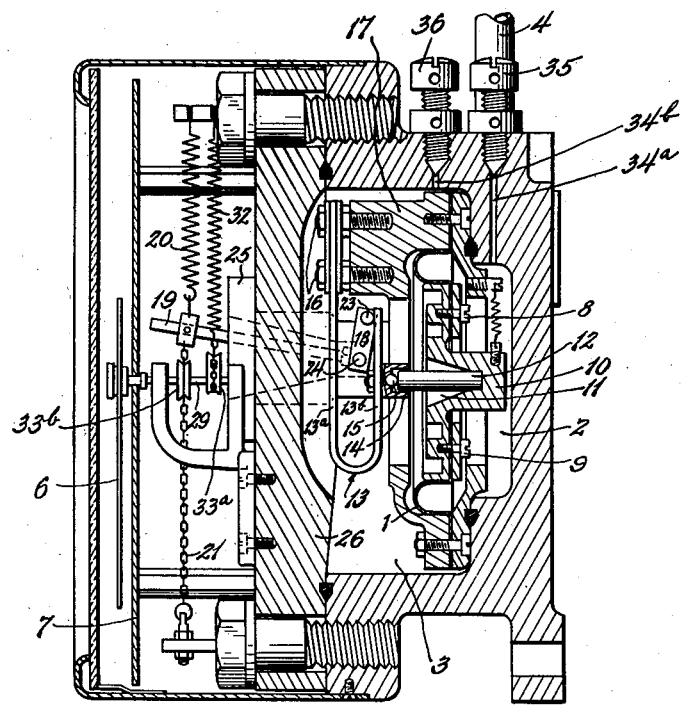
Fig. 1 is a sectional view of the measuring device.

The measuring instrument according to the drawings comprises a diaphragm 1 dividing a casing into two chambers 2 and 3, each of these chambers communicate to two tubes or pipes 4 and 5 respectively. These two pipes are connected, for instance in the case of a steam load meter to the steam pipe (not shown) provided in a well known manner with an orifice plate, one of said two pipes 4 and 5 branching off in front of and the other behind said plate. Between these two steam conduits there exists a differential pressure representing a measurement of the steam load so that the force of the diaphragm is likewise dependent on the steam load of the steam pipe. The two pipes are thus connected with reference to the orifice plate that the pressure in chamber 2 is greater than that in chamber 3. Therefore, the force of the diaphragm 1 is, according to Fig. 1, directed towards the left. This force is transmitted to a pointer 6 co-operating with a dial plate 7 in the following manner:

Fastened to the diaphgram 1 by means of screws 8 and 9 is a rigid block 10 having a recess 11 for one end of the pressure bolt 12. The other end is engaged by a U-formed laminated spring 13, the force of the spring being, according to Fig. 1, directed towards the right. In order to avoid any displacement of the bolt 12 transverse to said force direction, both ends of said bolt are guided by means of a holding member 14 fastened to the spring 13 and by means of the recess 11, the inner end of which preventing a transversal movement of the bolt with reference to the rigid block 10. A ball 15 inserted in the holder 14 reduces the friction in the axial movement of the bolt, thereby increasing the sensitiveness and exactness of the meter within the entire measuring range even in case of extremely high pressure load of the diaphragm 1. The diaphragm as shown in Fig. 1 having a great stroke tends to tilt, whilst with a diaphragm having a relatively small stroke this danger does not exist. These latter are inadequate specially in case of strong diaphragm pressures and of instruments provided in addition to the pointer system with a remote control and a device for extracting the root, which frequently is necessary by steam load meters.

Figure 3:
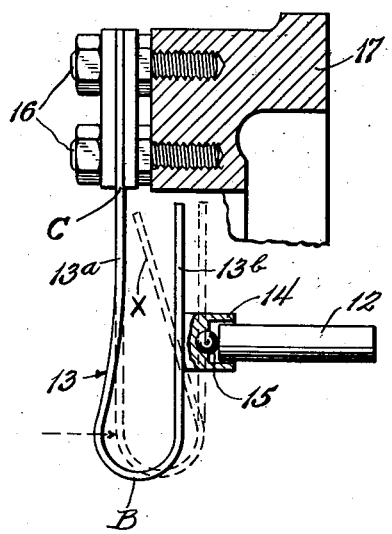
Fig. 3 illustrates the operation of an essential part of the instrument.
Figure 4:
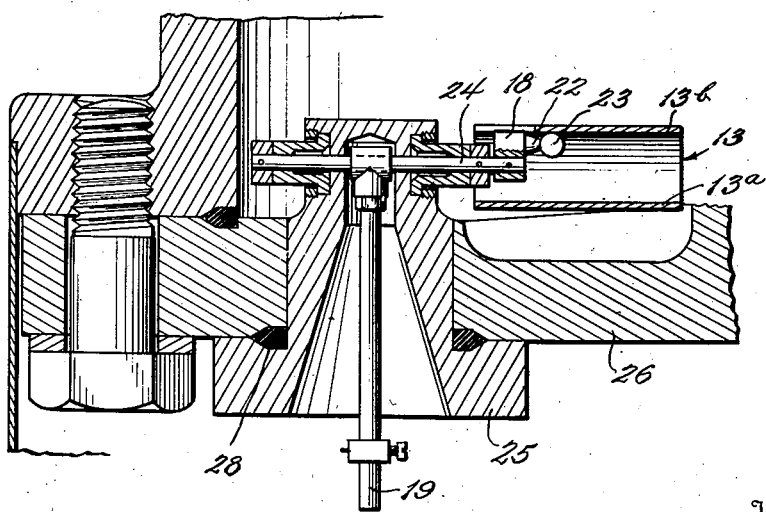
Fig. 4 is a sectional view, representing a further detail of the instrument.

The spring 13 has two shanks or limbs 13a and 13b. The limb 13a being fastened by means of screws 16 to a frame member 17 holding at the same time the diaphragm 1. When the pressure bolt 12 is moved towards the left by the diaphragm 1, the limbs 13a and 13b are simultaneously bent in the manner illustrated in Fig. 3 so that the shank or limb 13b is displayed parallel to itself, i. e. the inclination of the axis of the pressure bolt 12 and the shank 13b will not be changed. Due to this fact the pressure bolt 12 in moving axially will not be longitudinally displaced to the shank 13b and, therefore, it is possible to guide the bolt 12 by means of the holder 14 or the like. The parallel displacement of the shank 13b results from the fact that the inclination of the shank 13b with reference to the frame 17 is compensated by the inclination of the other shank 13a. Assume for instance that the shank 13a is rigid, then the shank 13b would take the inclined position X, according to which the inclination between the axis of the pressure bolt 12 and the shank 13b differs from that of the original position shown by the dotted lines in Fig. 3. As, however, the shank 13a also yields from the original position shown by the dotted lines into the position as shown by the drawn lines, the shank 13b rocks from the fictive position into the vertical position. The compensating effect is best achieved if the engaging point of the pressure bolt 12 on the shank 13b is situated approximately in the middle between the clamping point C of the shank 13a and the fictive bending axis B of the shank 13b (see Fig. 3). Besides these important advantages the U-form of the spring obviously reduces materially the dimensions of the instrument. Furthermore, the shank 13b may be used as a member to transmit the measuring movement of the diaphragm 1 and the pressure bolt 12.

According to the embodiment shown in the drawings, the shank 13b engages the arm 18 of a bell crank lever, to the other arm 19 of which is fastened a screw spring 20 and a chain 21, whose purpose will later be explained. The arm 18 carries a stud 22, the end of which touching the shank 13b of the U-formed spring is formed as a ball 23. The axis 24 of said bell crank lever is borne by a supporting member 25, fitted into the wall 26 of the casing comprising the two chambers 2 and 3 and the diaphragm 1. The supporting member 25 is fastened to the wall 26 in any convenient manner as by bolts 27 using a gasket ring 28 to tighten the supporting member 25 in the wall 26. The axis 24 is arranged so that the frontal areas at both ends are exposed to the same pressure, i. e. the pressure in the chamber 3. For this reason the axial forces acting upon the axis are compensated.

Figure 2:
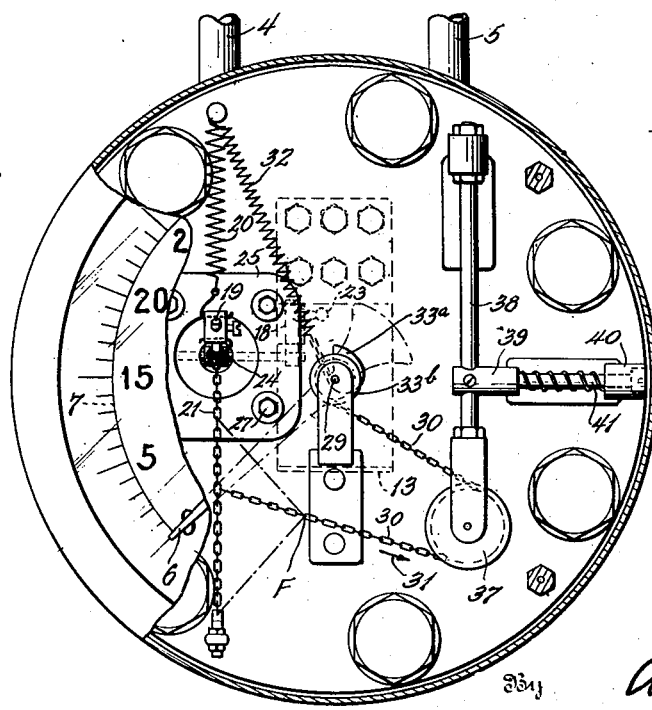
Fig. 2 is a view of the front of the instrument, parts of the dial plate being broken away.

The rocking movement of the lever arm 19 may directly be transmitted to the axis 29 of the pointer 6. In a steam load meter, for instance the differential pressure acting on the diaphragm varies or changes with the second power of the steam flow and it is, therefore, desirable to extract the root of the measuring value according to the rocking movement of the lever arm 19. To this end a corresponding device is inserted between said lever arm 19 and said pointer axis 29. This device will now be more fully explained. The lower end of the chain 21, mentioned above, is attached to the housing of the instrument in any convenient manner. To this chain is connected a second chain 30. This second chain 30 is stretched by a tractive force acting in direction of the arrow 31 (see Fig. 2) and being produced by a screw spring 32. This spring 32 engages a cam 33a fastened to the pointer axis 29. To this axis is fastened a pulley 33b to which one end of the second chain 30 is attached. The cam 33a is so arranged that the lever arm of the force of the spring 32 is approximately 0 in the original or zero position of the device as shown in Fig. 2. If the differential pressure acting on the diaphragm 1 increases so that the pressure bolt 12 moves towards the left (see Fig. 1), the bell crank lever will be rocked so as to move its arm 19 downwards, thereby diminishing the distance of the ends of the chain 21 so that the two parts of the chain 21 are inclined to each other due to the tractive force of the second chain 30. This chain is moved in the direction of the arrow 31 and in proportion to the root value of the movement of the lever arm 19. Therefore, the rotation of the pointer axis 29 resulting from the movement of the second chain 30 is likewise proportional to the root value of the movement of the lever arm 19, i. e. the pointer 6 indicates on a linear scale 7 directly the steam flow to be measured. During the rotation of the pointer axis 29 in clockwise direction the lever arm of the spring 32 gradually increases in accordance to the spiral curve of the cam 33a. This curve is for the purpose of compensating the change in the force of the spring 32 by changing correspondingly the lever arm of this spring force. The more the lever arm 19 rocks downwards, the tension of the spring 32 decreases, however, the more the lever arm for this spring increases so that the decreasing of the spring force 32 does not influence the turning moment exerted by said force on the pointer axis 29. It is to be noted that the cam 33a is arranged in such a manner on the pointer axis 29 that in the zero position of the pointer 6, i. e. in the position in which the chain 21 coincides with the straight connecting line of its ends, the lever arm of the spring 32 is zero. In this way the tractive force of the chain 30 will become zero as soon as the lever 19 reaches its zero position. Of course, this is essential for an accurate root extraction. Furthermore, to remove or at least to reduce inaccuracies it is advisable to arrange the chains 21 and 30 with respect to each other in such a manner that the second chain 30 is displaced as little as possible in transverse direction. As shown in Fig. 2, the inclination of the chain 30 is exactly the same in the original position and a final position F represented in dotted lines in Fig. 2, whilst in all intermediate positions the inclination practically does not vary.

In cases in which an extreme exactness is to be guaranteed or in which a very large measuring range is demanded, the inclination of the second chain 30 may be kept exactly constant by adjusting preferably uniform both ends of the first chain 21 in accordance to the movement of the pressure bolt 12. It is then possible to hold the chain 30 always at right angle to the fictive connecting line of both ends of the chain 21.

Two channels 34a and 34b are provided in the wall of the casing which are adapted to vent the chambers 2 and 3 and which may be shut off by means of stopper screws 35 and 36.

In order to facilitate the adjustment of the instrument, according to the embodiment shown in the drawings, an adjustable pulley 37 is provided over which the second chain 30 passes, said pulley being rotatably mounted on a yielding arm 38, which is connected to a screw piece 39 engaged by a screw 41, rotatably mounted as at 40 on the casing. By adjusting this screw the arm 38 will be deflected and, therefore, the pulley 37 displaced approximately in direction of the arrow 31. In this way the position of the pointer 6 with reference to the original or zero-position of the chain 21 may be changed to correct the zero-position if necessary.

It is to be noted that the present invention is not restricted to the particular embodiment herein shown and described, variations of the different parts of the meter, as e. g. the substitution of the chains by any other flexible tension member may easily be done without departing from the spirit of the invention, whose important characteristics will now be defined in the following claims.

What is claimed:

1. In a device of the kind described in combination a pressure responsive means, a force transmitting member engaged by said pressure responsive means, a U-formed leaf spring acting on said force transmitting member in opposition to the force of the pressure responsive means, said U-formed leaf spring comprising a first and a second shank, said first shank being clamped at one end in the manner of a cantilever beam and said second shank being engaged by said force transmitting member, the engaging point of said force transmitting member on said second shank lying approximately in the middle between the clamping point of said first shank and the fictive bending axis of said second shank.

2. In a device of the kind described in combination a pressure responsive means, a force transmitting member engaged by said pressure responsive means, a U-formed leaf spring acting on said force transmitting member in opposition to the force of the pressure responsive means, said U-formed leaf spring comprising a first and a second shank, said shanks being so arranged behind each other in relation to a clamping point that the inclination due to the bending stress of the second shank, engaged by said motion transmitting member, will be compensated by the inclination due to its bending stress of the first shank, a motion transmitting member adapted to transmit the movement of said pressure responsive means, said motion transmitting member being linked directly to said second spring shank.

3. A device as claimed in claim 2, in which the end of said motion transmitting member engaging the second spring shank has a spherical shape.

4. In a device of the kind described in combination a slack diaphragm having a relatively great stroke, a force transmitting bolt, movably mounted so that it follows up the stroke of the diaphragm, a rigid guiding block, fastened to the middle part of said diaphragm, said guiding block having a recess, being engaged by said bolt and adapted to prevent any transverse displacement of said bolt, a spring means, engaging said force transmitting bolt so as to hold one end of said bolt in engaging relation to said recess.

5. In a device of the kind described in combination a slack diaphragm having a relatively great stroke, a force transmitting bolt, movably mounted so that it follows up the stroke of the diaphragm, a rigid guiding block, fastened to the middle part of said diaphragm, said guiding block having a recess, being engaged by said bolt and adapted to prevent any transverse displacement of said bolt, a spring means, engaging said force transmitting bolt so as to hold one end of said bolt in engaging relation to said recess, said spring means being provided with a second guiding member having likewise a recess, being engaged by the other end of said bolt.

6. A device as claimed in claim 5, in which a force transmitting ball is inserted between said second guiding member and said force transmitting bolt.

7. In a device of the kind described in combination a slack diaphragm having a relatively great stroke, a force transmitting bolt, being movably mounted so that it follows up the stroke of the diaphragm, a U-formed leaf spring acting on said force transmitting bolt so as to hold it in engaging relation to said diaphragm, a rigid guiding block fastened to the middle part of said diaphragm, said guiding block having a recess being engaged by one end of said bolt and adapted to prevent any transverse displacement of said bolt end, the other end of said bolt being engaged by a second guiding member having a recess to receive said other end of said bolt, said U-formed leaf spring comprising a first and a second shank, said first shank being rigidly fixed and said second shank being engaged by said force transmitting bolt, the engaging point of said force transmitting bolt on said second shank lying approximately in the middle between the clamping point of said first shank and the fictive bending axis of said second shank.

8. In a device of the kind described in combination a pressure responsive means, a force transmitting member engaged by said pressure responsive means, a spring means engaging said force transmitting member so as to hold it in engaging relation to said pressure responsive means, a motion transmitting member adapted to transmit the movement of said pressure responsive means to a pointer system, said motion transmitting member being directly engaged by said spring means, a means for extracting the root of the measuring value according to the movement of said motion transmitting member, said root extracting means including a first flexible tension strip connected to said motion transmitting member to vary the distance between the ends of said flexible strip in accordance with the movement of said motion transmitting member, a second flexible tension strip connected to approximately the middle of said first flexible tension strip, means to exert a tractive force on said second strip, said second strip being arranged substantially transverse to the connecting line of the ends of said first strip so as to be pulled by said tractive force means in accordance with the root value of the movement of said motion transmitting member.

9. In a device of the kind described in combination a casing, a pressure responsive means, a force transmitting member engaged by said pressure responsive means, a spring means engaging said force transmitting member so as to hold it in engaging relation to said pressure responsive means, a rocking lever adapted to transmit the movement of said pressure responsive means to a pointer system, a means for extracting the root of the measuring value according to the movement of said rocking lever, said root extracting means including a first flexible tension strip, one end of which being connected to a part of said casing and the other end to said rocking lever, to vary the distance between the ends of said flexible strip in accordance to the movement of said rocking lever, a second flexible strip connected to approximately the middle of said first flexible tension strip, means for exerting a tractive force on said second strip, said second strip being approximately transverse to the connecting line of the ends of said first strip so as to be pulled by said tractive force means in accordance with the root value of the movement of said rocking lever, indicating means connected to be controlled by said second strip to follow up its root value movement.

10. A device as claimed in claim 8, in which the first and the second flexible tension strips are so arranged that within the entire working range the second strip remains approximately parallel to itself.

11. In a device of the kind described in combination a pressure responsive means, a force transmitting member engaged by said pressure responsive means, a first spring means engaging said force transmitting member so as to hold it in engaging relation to said pressure responsive means, a motion transmitting member engaged by said first spring means, a means for extracting the root of the measuring value according to the movement of said motion transmitting member, said root extracting means including a first flexible tension strip operatively connected to said motion transmitting member to vary the distance between the ends of said flexible strip in accordance with the movement of said motion transmitting member, a second flexible tension strip connected to approximately the middle of said first flexible tension strip, a second spring means mounted to exert a tractive force on said second strip, said second strip being approximately transverse to the connecting line of the ends of said first strip so as to be pulled by said second spring means in response to the root value of the movement of said motion transmitting member, an axis rotated by said second strip in response to said root value, variable lever means for said second spring means arranged to vary the lever arm for said second spring means in response to variations of force exerted by said spring means so as to compensate the decreasing of said force by increasing said lever arm.

12. A device as claimed in claim 8, in which means are provided for guiding said second strip to be longitudinally displaced upon movement of said motion transmitting member in direction of the line connecting the zero position and the end position of the connecting point of said first and said second strip so that within the entire working range the second strip is practically not displaced in transverse direction.

13. In a device of the kind described in combination, a pressure responsive means, a force transmitting member engaged by said pressure responsive means, a first spring means engaging said force transmitting member so as to hold it in engaging relation to said pressure responsive means, a motion transmitting member engaged by by said first spring means, a means for extracting the root of the measuring value according to the movement of said motion transmitting member, said root extracting means including a first flexible tension strip operatively connected to said motion transmitting member to vary the distance between the ends of said flexible strip in accordance with the movement of said motion transmitting member, a second flexible tension strip connected to approximately the middle of said first flexible tension strip, a second spring means mounted to exert a tractive force on said second strip, said second strip being approximately transverse to the connecting line of the ends of said first strip so as to be pulled by said second spring means in response to the root value of the movement of said motion transmitting member, an axis rotated by said second strip in response to said root value, a cam operatively connected to said axis, said second spring means acting upon said cam so as to exert a moment thereon, said cam having a spiral curve for varying the lever arm for said second spring means so as to compensate the decreasing of said second force by increasing its lever arm.

14. A device as claimed in claim 13, in which in the zero position of said pressure responsive means and of said motion transmitting member, said first strip coincides with the straight connecting line of its ends, said cam being mounted on said axis in such a manner that in the zero position the lever arm of said second spring means is approximately zero.

15. In a pressure responsive instrument in combination a slack diaphragm having a relatively great stroke; a force transmitting member being movably mounted for following up the stroke of said diaphragm; a U-shaped leaf spring acting on said force transmitting member in opposition to the force of said diaphragm; said leaf spring including a first and a second spring shank; said first shank being clamped at one end in the manner of a cantilever beam, whilst said second shank engages said force transmitting member at a point lying approximately in the middle between the clamping point of said first shank and the fictive bending axis of said second shank, and guiding means for said force transmitting member for preventing a transverse displacement of said member whilst following up the stroke of said diaphragm.

JULIUS ZOLLER.
AUGUST HOFFMANN.